Dec. 31, 1968   M. R. CAMPBELL ET AL   3,419,218
THRUST REVERSER
Filed Feb. 23, 1967   Sheet 1 of 3
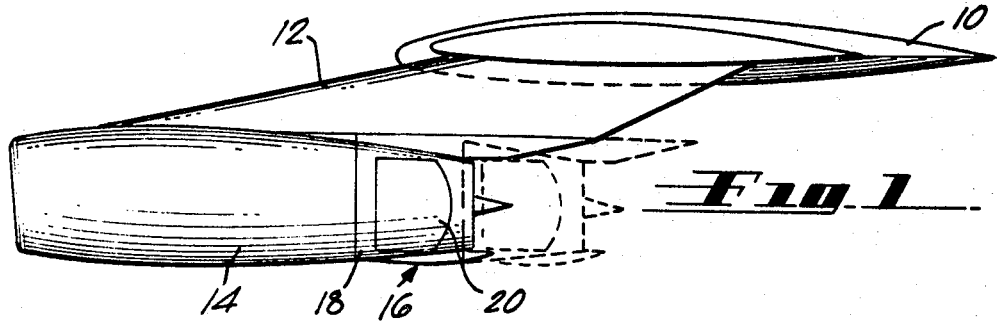
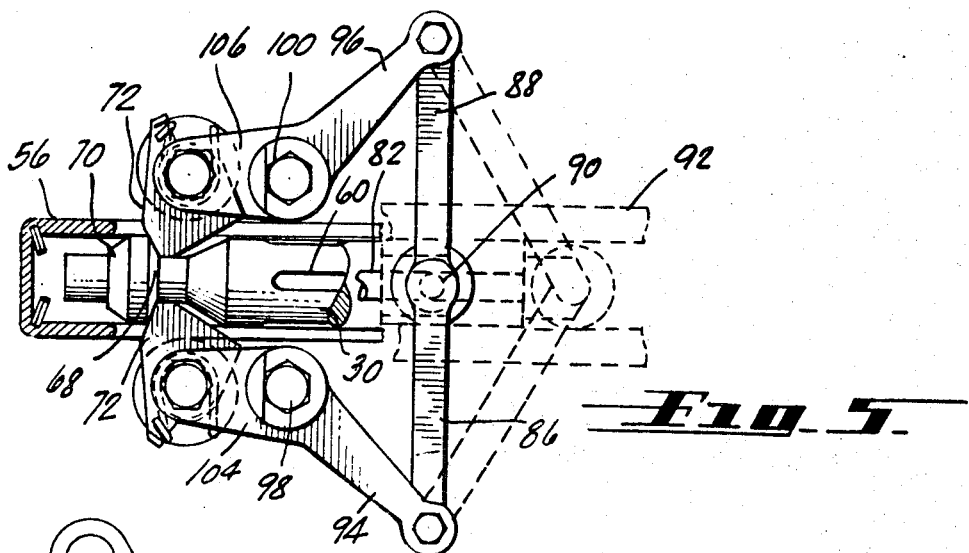
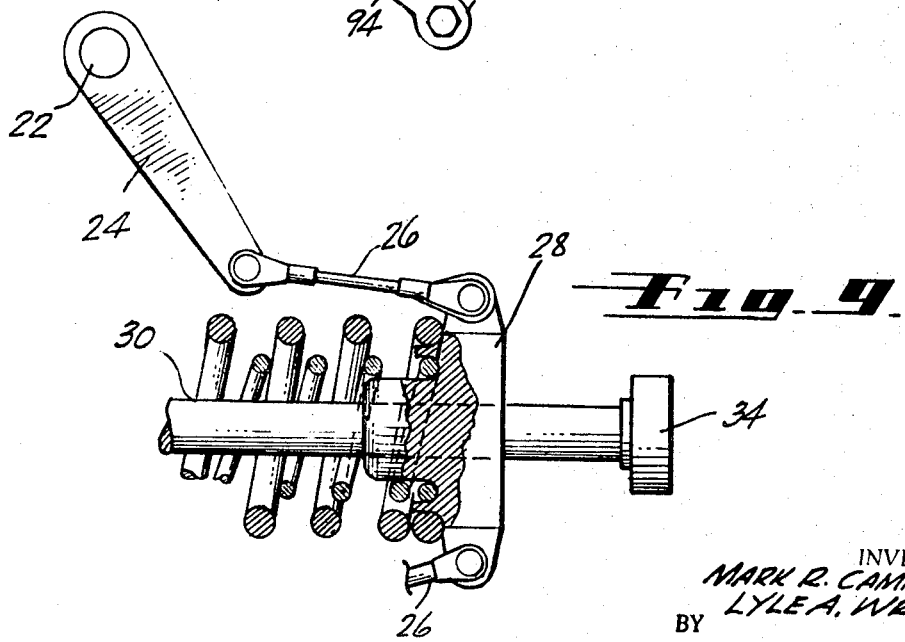
INVENTORS.
MARK R. CAMPBELL
LYLE A. WRIGHT
BY
-AGENT-

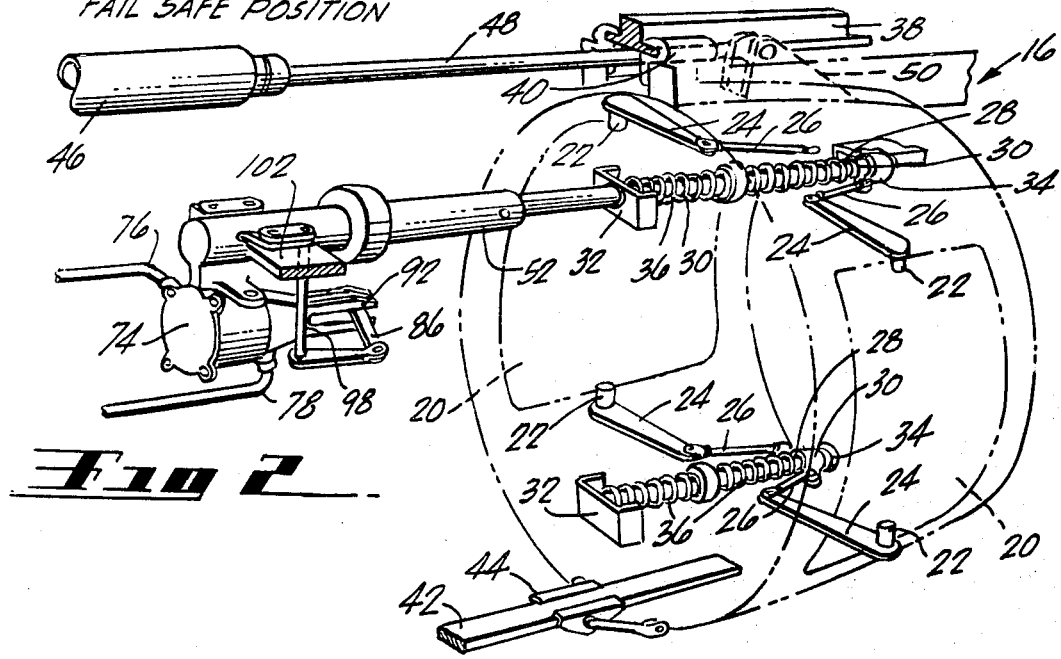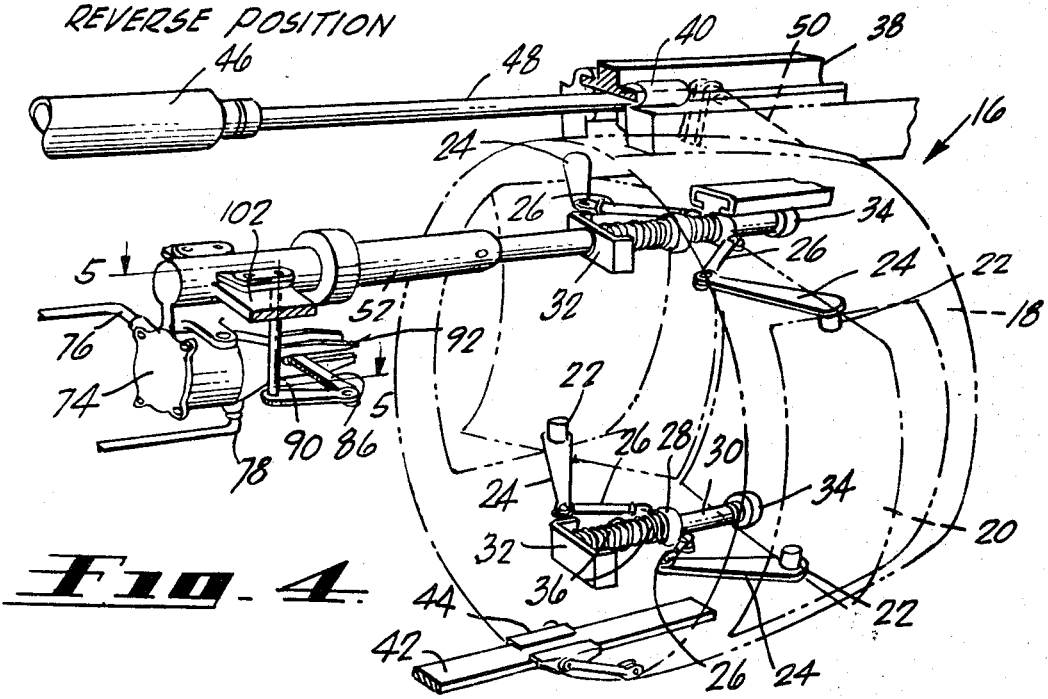

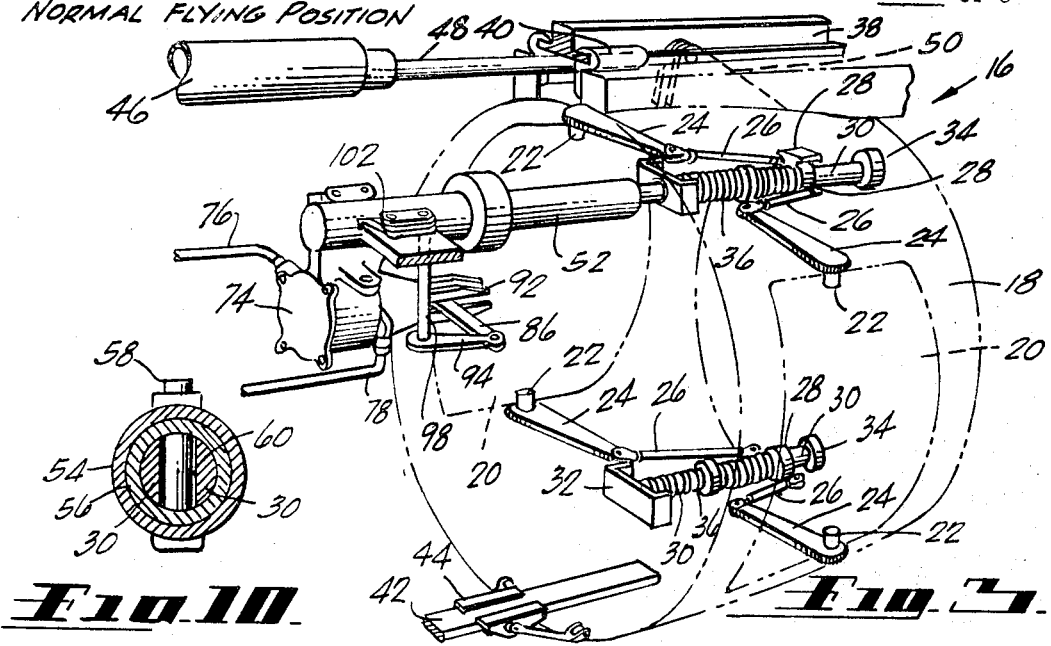
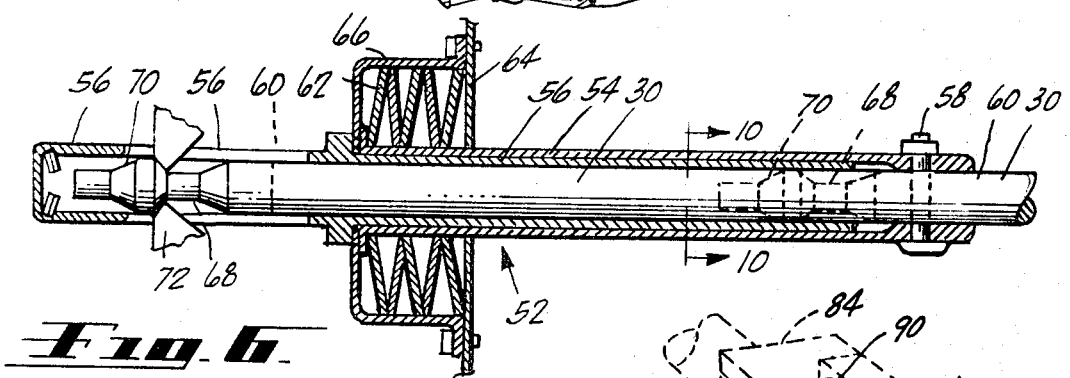
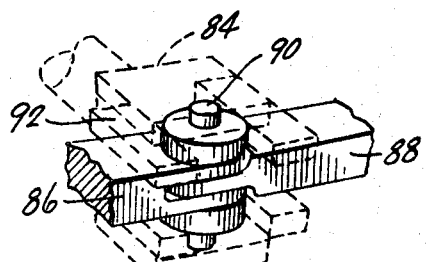
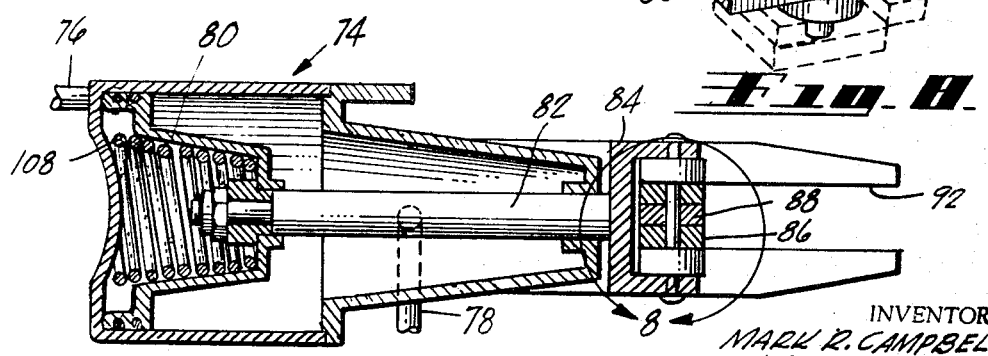

United States Patent Office 3,419,218
Patented Dec. 31, 1968

3,419,218
THRUST REVERSER
Mark R. Campbell, La Mirada, and Lyle A. Wright, Seal
Beach, Calif., assignors, by mesne assignments, to McDonnell Douglas Corporation, Santa Monica, Calif., a
corporation of Maryland
Filed Feb. 23, 1967, Ser. No. 617,888
4 Claims. (Cl. 239—265.37)

ABSTRACT OF THE DISCLOSURE

This invention relates to an apparatus for reversing the propulsion of gas discharge aircraft engines. The reversing apparatus of this invention has a self-contained mechanical power source for the reversing bucket operation which may be operated with or without the engine operating. The inventive apparatus also includes a fail-safe means to insure positioning of the reverser in the non-operating position if, during flight, any failure occurs which would prevent such movement.

Background of invention

Jet deflectors of various designs have been devised for intercepting the gases issuing rearwardly from the jet nozzle of an engine for propulsion of an aircraft or other vehicle, and deflecting the gases forwardly to the greatest practicable extent. The deflection of the gases forwardly effects a rearward thrust to decelerate a just-landed aircraft, the deflection being comparable to the rearward thrust of an engine with propeller blades reversed in pitch.

A variety of devices have been proposed to deflect the gases forwardly. One of the most common type of a device and a device that has been discovered to be most efficient, is the device which mechanically blocks the engine exhaust duct or tailpipe. Usually such devices consist of a pair of symmetrical blocker doors or buckets, pivotally mounted within the engine tailpipe and arranged to come into abutment in the center of the exhaust gas stream, to cause the stream to deflect in the manner stated above.

In addition, the location of the thrust reverser has involved problems of the mounting and movement of the reverser. It is desired that the buckets, when in use, to be positioned to give maximum efficiency as to the reversal of thrust. Also, when not in use, the reverser structure is to be stored so as to cause minimum aerodynamic drag. To effect both of the above objectives it has been found necessary to mount the reverser buckets in a translating ring which is movable between a forward or stored position and an aft or reversing position.

Further difficulties have been encountered in the mounting and employment of such reversers. The buckets must be movable immediately into operative position. The buckets are, exposed to the extremely high temperatures of the impinging gases. Also, the buckets must be sufficiently strong to withstand and to transmit to the airframe structure the full thrust of the engine's exhaust, plus the relative airflow.

Another desirable design feature in a thrust reverser such as the one described above is the assuring that the bucket actuation mechanism causes the buckets to open and close at the same velocity. This mechanism should accurately synchronize the position of the buckets at all points in their travel to prevent any appreciable transverse gas force from becoming imposed on the engine housing or tailpipe because of dissimilarities in the gas streams energizing from either side of the buckets.

Finally, it has always been thought to be of great advantage if the reverser could be employed during flight for purposes of effecting a fast slow-down of the aircraft preparatory to landing. However, the remote possibility that a part of the actuating structure would fail preventing movement of the buckets to the stowed position, thereby causing the aircraft to crash, prohibited any use of the buckets during flight. To this end, designers have attempted to construct a fail-safe mechanism which would insure the movement of the buckets to the stowed position. However, the possibility has also remained that these fail-safe mechanisms in themselves are not fail-safe in operation.

Also, it is an absolute must that the reverser structure be specifically constructed not to permit any premature opening of the buckets due to any unusual aerodynamic forces. Usually, some sort of locking device is employed to prevent any such opening of the reverser buckets.

Summary

Briefly, the thrust reverser of this invention is of the design to block the engine exhaust by means of a pair of symmetrical buckets, the buckets being synchronized in operation. The thrust reverser and associated actuating structure is designed to be of minimum weight without forfeiting the requisite strength requirements. The opening and closing action of the reverser buckets is positive in action with the inclusion of a fail-safe apparatus to insure movement of the reverser buckets to the closing position. Specifically, the inventive concepts of this thrust reverser is embodied in a particular design of bucket operating linkage, the linkage being spring biased to the open position in view of the aerodynamic forces thereby requiring the minimum size in the hydraulic actuating apparatus.

An object of this invention is to provide a thrust reverser apparatus for a jet engine which is fail-safe in operation from the open to the closed position.

A further object of this invention is the use of a self-contained mechanical power source that can be operated without the engine in operation, thereby, facilitating ground checkout and operational runs.

Further objects and advantages of this invention will be readily appreciated and more clearly understood by reference to the following description when considered in connection with the accompanying drawings.

Description of the drawings

FIG. 1 is a pictorial view showing the reverser apparatus of this invention as would be applied to a jet engine;

FIG. 2 is a schematic view of the reverser apparatus of this invention in the full extended fail-safe position;

FIG. 3 is a schematic view of the reverser apparatus of this invention in the normal flying position with the fail-safe mechanism cocked;

FIG. 4 is a schematic view of the reverser apparatus of this invention showing the reverser structure in the reversing position;

FIG. 5 is a view taken along 5—5 of FIG. 4 showing in detail the particular fail-safe mechanism of this invention;

FIG. 6 is a cross-sectional view of the bucket actuating rod assembly incorporated in this invention;

FIG. 7 is a cross-sectional view of the actuating cylinder for the fail-safe mechanism of FIG. 5;

FIG. 8 is a view taken along line 8—8 of FIG. 7;

FIG. 9 is a part-sectional view of the bucket linkage to effect the operation of the buckets; and FIG. 10 is a cross-sectional view of the fail-safe actuating rod taken along line 10—10 of FIG. 8.

Description of the shown embodiment

The thrust reverser of this invention as shown in FIG. 1 depicts the reverser as would be employed in conjunction with a jet engine. In FIG. 1 there is shown an aircraft wing 10, an engine pylon 12, and a jet engine 14. The engine 14 is commonly known as an extended pod fan-jet engine. The reverser structure of this invention is shown broadly as 16, which includes a translating ring 18 and reverser buckets 20. In FIG. 1 the solid lines represent the stowed position of the thrust reverser of this invention, and the dotted lines represent the position of the thrust reverser in its reversing or operable position.

Referring now to FIGS. 2, 3 and 4, the reverser apparatus is depicted in three different positions. FIG. 4 shows the reverser located in its operable or reversing position. FIG. 3 shows the reverser located in the normal flying position. FIG. 2 shows the reverser structure with the translating ring fully extended, but with the reverser buckets not opened (fail-safe position). In order to simplify the explanation of the reverser structure of this invention, the position of the reverser shown in FIG. 3 will be described first, then FIG. 4 and then FIG. 2.

The reverser structure shown in FIG. 3 is in the same position as the solid lined reverser structure in FIG. 1. This position is the normal flying position with the reverser structure blending in with the design of the aircraft nacelle itself to minimize aerodynamic drag. As appears obvious from the drawing, the buckets 20 are pivotally mounted within the translating ring 18 which resembles a section of a truncated cone. The buckets 20 are symmetrically spaced apart within the translating ring 18 and are of equal size. The buckets 20 are pivoted in such a manner that they can each contact each other at their aft most edge. The specific linkage arrangement which effects the bucket movement is identical at both the top and the bottom of the buckets. Also, the linkage arrangement for one bucket 20 is identical with respect to the other bucket 20. Attached to the bucket 20 by means of a pivot pin 22 is a bucket arm 24, the pivot pin 22 being mounted on one end of the arm 24. Attached to the other end of the arm 24 is a link 26 which is in turn connected to a collar 28. It is to be noted that only the upper two such bucket arms 24 and their associated links 26 and pivot pins 22 are necessary in order to operate the buckets 20. The collar 28 is slidably mounted on a rod 30, one end of the rod 30 adjacent the rod stop 34, A spring 36 is operatively associated with the rod 30 between the collar 28 and a fixed bracket 32 through which the rod 30 is slidably mounted. As before mentioned, the linkage arrangement located on the top end of the buckets is identical with the linkage arrangement located on the lower end of the buckets. Also, the rod 30 and spring 36 arrangement as hereinbefore described is substantially identical at both the upper and lower ends of the buckets. However, the rod 30 on the upper end of the buckets is extended forward and not fixed to the translating ring as the rod 30 on the lower end of the buckets. The bracket 32 is connected to the translating ring and serves as the fixed element upon which the spring 36 is to act.

The translating ring 18 is capable of longitudinal movement with respect to the jet engine. This movement must be sufficient so that the reverser buckets when opened are located or positioned aft of the nozzle of the jet engine at predetermined distance (to be determined through experimentation). The translating ring is adjustable by means of a guide and track arrangement. An upper track 38 is fixedly secured to the nacelle pylon 12. A guide 40 is adjustably movable on the track 38 and is connected to the translating ring 18. Track 38 and guide 40 are the main supporting means for the translating ring. An auxiliary track 42 and guide 44 are located diametrically opposite the track 38 and guide 40. The purpose of the auxiliary guide 44 and track 42 is to assure that the translating ring moves precisely as desired.

The translating ring 18 is moved by means of a hydraulic actuating cylinder 46 through rod 48 which is connected to the translating ring 18 through trunion 50. Rod 30 is extended past the bracket 32 and movable with respect thereto a sufficient distance to operate in housing 52. Housing 52 is fixedly secured to the jet engine structure 14 and pylon structure 12. The interior of the housing 52 is clearly shown in FIG. 6. Housing 52 includes an outer tube 54 and an inner tube 56. Tube 54 is movable with respect to tube 56. The length of the tubes 54 and 56 are sufficient to confine the length of travel of the rod 30 within the housing 52. Located at the aftmost end of the outer tube 54 is a bolt 58 which extends diametrically across the tube 54. The bolt 58 is meant to ride within a slot 60 within the tube 30. Bolt 58 functions to contact the forward terminal end of the slot 60 and prevent further movement of the rod 30. To prevent rupture of the bolt 58 and damage to the rod 30 upon impact, tube 54 is connected at the forward end to a buffer spring 62. The spring 62 operates on a plate 64 which is connected to a spring housing 66 which in turn is fixed to the associated jet engine structure. The forward end of the rod 30 includes a recessed portion 68 and a beveled terminal end portion 70. The recessed portion 68 and the beveled end 70 are specifically designed to cooperate with a pawl means 72, the function and operation of which will be described further in the specification. The forward end of the inner tube 56 is fixed through associated structure to the jet engine.

The pawl means 72 is operable through a pneumatic actuator 74. The actuator 74 has air supplies 76 and 78 which by selectively passing air therethrough can move pistons 80 either forward or aft as the case may be. The piston rod 82 is bifurcated at its terminal end 84. Pivotally connected through the legs of the bifurcation of the terminal end 84 are two crosslinks 86 and 88 which are connected together through pivot pin 90 to the bifurcated end 84. Each of the crosslinks 86 and 88 extend the same distance on either side of the pivot pin 90. The crosslinks 86 and 88 are slidingly supported in a guide means 92, the guide means 92 being merely an extension of the housing of the actuator 74. Pivotally connected to each end of the crosslengths 86 and 88 is a connecting link 94 and 96, respectively and connected to each of the links 94 and 96 is a rod 98 and 100 respectively. Rods 98 and 100 are rotatably held through a fixed portion 102 of the housing 52. Each of the rods 98 and 100 are fixedly connected to an arm 104 and 106, respectively. Each of the arms 104 and 106 are pivotally connected to a respective pawl 72. Through this respective mechanical linkage arrangement, it appears obvious that upon actuation of the actuator 74 the piston causes the crosslinks 86 and 88 to be moved aft a slight distance determined by the guide 92. This creates a certain rotational movement upon the links 94 and 96 which in turn rotates the rods 98 and 100. This rotational movement is imparted through the arms 104 and 106 to the pawls 72, which causes them to be displaced out of engagement with the recessed portion 68. By moving of the piston rod 82 forwardly forcing air through port 78, the pawls 72 can be returned to the position within the recess portion 68. It is desired that upon the emission of fluid into port 76, thereby actuating piston 80, that such actuation should be a snap action. To this end, a spring 108 is provided to give the piston 80 an initial movement.

The operation of the thrust reversal apparatus of this invention is as follows: With the thrust reverser structure in the position of FIG. 3 which is the normal flying position, the translating ring 18 and the reverser buckets 20 are in their stowed position when the operator of the aircraft decides that it is necessary to employ the reverser, he causes the actuation of the actuating cylinder 46. Rod 48 then moves longitudinally aft and as it is fixedly connected to the translating ring 18 through trunion 50, translating ring 18 also likewise moves aft. The translating ring 18 moves a substantial distance before the buckets 20 begin their opening movement. Actually, it is not until the collar 28 engages the rod stop 34 that the buckets 20 will begin their opening movement. With the pawls 72 engaged, as the translating ring continues its aft movement, the buckets 20 are opened due to the relative movement between the translating ring and the rod 30. When the translating ring 18 has reached its maximum displaced position, the reverser buckets are located substantially transverse to the longitudinal axis of the translating ring, as shown in FIG. 4. With a reverser in this position, the thrust of the jet engine is changed from a forward thrust to a reverse thrust of about 36% of the forward thrust. As a result when the aircraft is on the ground, the aircraft's forward movement can be retarded. When the aircraft is in the air, the employment of the reverser will create a substantial drag to slow down the aircraft.

The reverser of this invention is designed for use with the aircraft in the cruise flight mode as it may be desirable at times to effect the fast slow-down of the aircraft for a subsequent landing. Because of the fear that once employed, some portion of the reverser apparatus will fail, leaving the aircraft with a resultant reverse thrust during cruise, it is necessary that a fail-safe mechanism be employed in conjunction with the reverser structure. Assuming that the reverser had been employed with the aircraft in a cruise flight mode and the aircraft has reached its desired slowdown speed, the pilot will then activate actuating cylinder 46 to return the translating ring and reverser buckets to their stored or faired position. If the actuating cylinder 46 fails to function, the pilot thereupon actuates actuator 74, causing hydraulic fluid to enter through port 76 and operate on piston 80. Piston 80 subsequently moves translating movement of the crosslinks 86 and 88, which subsequently rotates the links 94 and 96 and rods 98 and 100, which thereupon through the arms 104 and 106 disengages the pawls 72 from the recessed portion 68 of the rod 30. Because the springs 36 are in the compressed state, the springs 36 will force the rod 30 in the aft direction. Bolt 58 rides within the slot 60 of the rod 30 which acts as a stop for the rod 30. With the rod assuming this position, the buckets thereupon are returned to the faired position within the translating ring 18. Consequently, the thrust of the aircraft is changed from the reverse direction to the forward direction and the aircraft can then proceed. Because of the great amount of stored energy of the springs 36, the rod 30 will be moved aft with a relatively high degree of inertia. To counteract such inertial movement, the bolt 58 is connected through the outer tube 54 and operates on the buffer spring 62, in this manner the spring 62 will absorb all the resultant inertial force of the rod 30, thereby preventing damage to the reverser structure itself. In FIG. 2 the reverser apparatus is shown in the full extended position with the fail-safe structure having been actuated.

We claim:

1. A thrust reverser for a jet engine having an exit nozzle comprising:
   a translating ring being concentrically disposed adjacent said jet engine exit nozzle, said translating ring being capable of longitudinal movement with respect to said jet engine along the axial line of said jet engine between a forward stowed position and a rear extended position;
   two buckets being pivotally mounted within and comprising a portion of said translating ring, said buckets being symmetrically positioned within said translating ring and designed for movement into the interior of said translating ring to block the area of said exit nozzle;
   bucket actuating means for moving said buckets into the interior of said translating ring during movement of said translating ring, said bucket actuating means including bucket linkage, said linkage being biased by a spring means which tends to cause said buckets to move from the blocking position to the stowed position within said translating ring.

2. A thrust reverser for a jet engine as defined in claim 1 wherein:
   said bucket actuating means includes a detent means, said detent means being operable to prevent further movement of said bucket linkage with respect to the movement of said translating ring thereby causing said buckets to move to the blocking position.

3. A thrust reverser for a jet engine as defined in claim 2 wherein:
   said detent means being actuatable by an actuating means separate from the actuating means for said translating ring, upon actuation of said detent means said bucket linkage is acted upon by said spring means and allows movement of said buckets from the blocking position to the stowed position.

4. A thrust reverser for a jet engine as defined in claim 3 wherein:
   said bucket actuating means includes an actuating rod, said rod has a depression therein, a pawl means being capable of locking engagement with said depression, said pawl means and said depression forming a portion of said detent means.

References Cited

UNITED STATES PATENTS

| | | | |
|---|---|---|---|
| 2,680,948 | 6/1954 | Greene | 239—265.37 |
| 2,708,825 | 5/1955 | Neary | 239—265.37 |
| 3,015,936 | 1/1962 | Brewer et al. | 239—265.19 |

EVERETT W. KIRBY, *Primary Examiner.*